United States Patent [19]
Young

[11] 3,862,502
[45] Jan. 28, 1975

[54] CLAM HARVESTER

[76] Inventor: Ben Young, P.O. Box 1016, Cordova, Alaska 99574

[22] Filed: Oct. 19, 1973

[21] Appl. No.: 407,826

[52] U.S. Cl. ............................. 37/55, 37/63, 37/71
[51] Int. Cl. .............................................. E02f 5/00
[58] Field of Search ........... 37/55, 119, 120, 62, 63, 37/71

[56] References Cited
UNITED STATES PATENTS

| | | | |
|---|---|---|---|
| 279,373 | 6/1883 | Friend | 37/119 |
| 1,168,293 | 1/1916 | Emmons | 37/119 |
| 1,270,142 | 6/1918 | Gage, Sr. | 37/63 X |
| 1,415,113 | 5/1922 | Phillips, Jr. | 37/55 |
| 3,618,236 | 11/1971 | Pipkin | 37/63 |
| 3,624,933 | 12/1971 | Faldi | 37/71 X |
| 3,688,511 | 9/1972 | Harmstrof | 37/62 X |

*Primary Examiner*—Clifford D. Crowder
*Attorney, Agent, or Firm*—Wells, St. John & Roberts

[57] ABSTRACT

A clam harvester for harvesting clams, especially razor clams, from the ocean floor. The harvester includes a framework supported on a pair of runners that is attached by a towline to a surface vessel. A set of jet nozzles is held below the runners, extending downwardly into the soil below the surface of the ocean floor. Fluid is supplied, under pressure, to the nozzles so that jets of fluid from the nozzles will dislodge the soil and clams and suspend the soil and clams in a liquid suspension ahead of the nozzles as the harvester is pulled along. An enclosure net is mounted to the harvester behind the jet nozzles to sift through the liquid suspension and entrap the clams therein while allowing the suspended soil to settle back to its original location.

5 Claims, 4 Drawing Figures

PATENTED JAN 28 1975 3,862,502
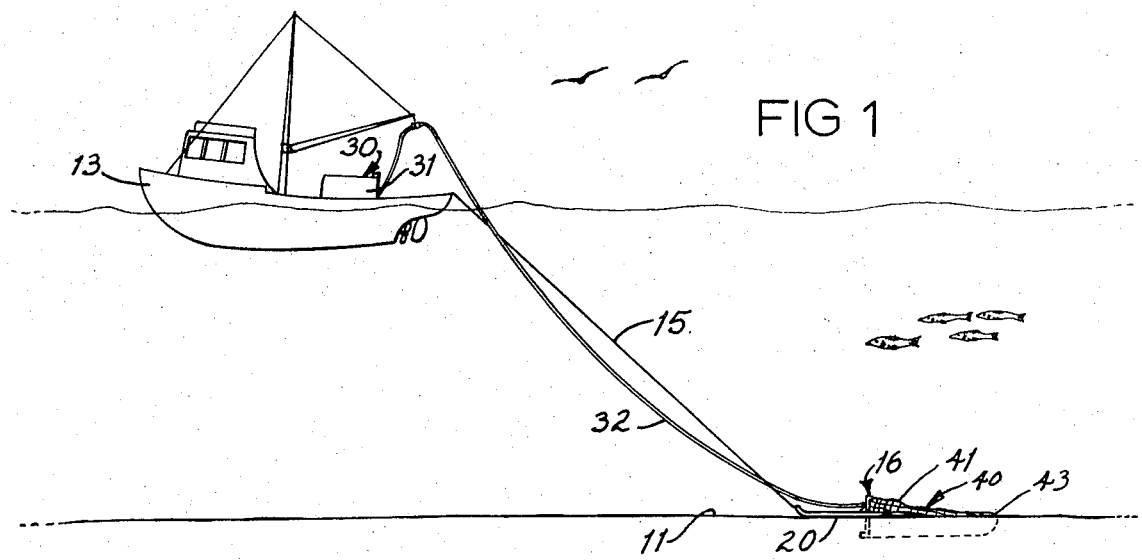
FIG 1
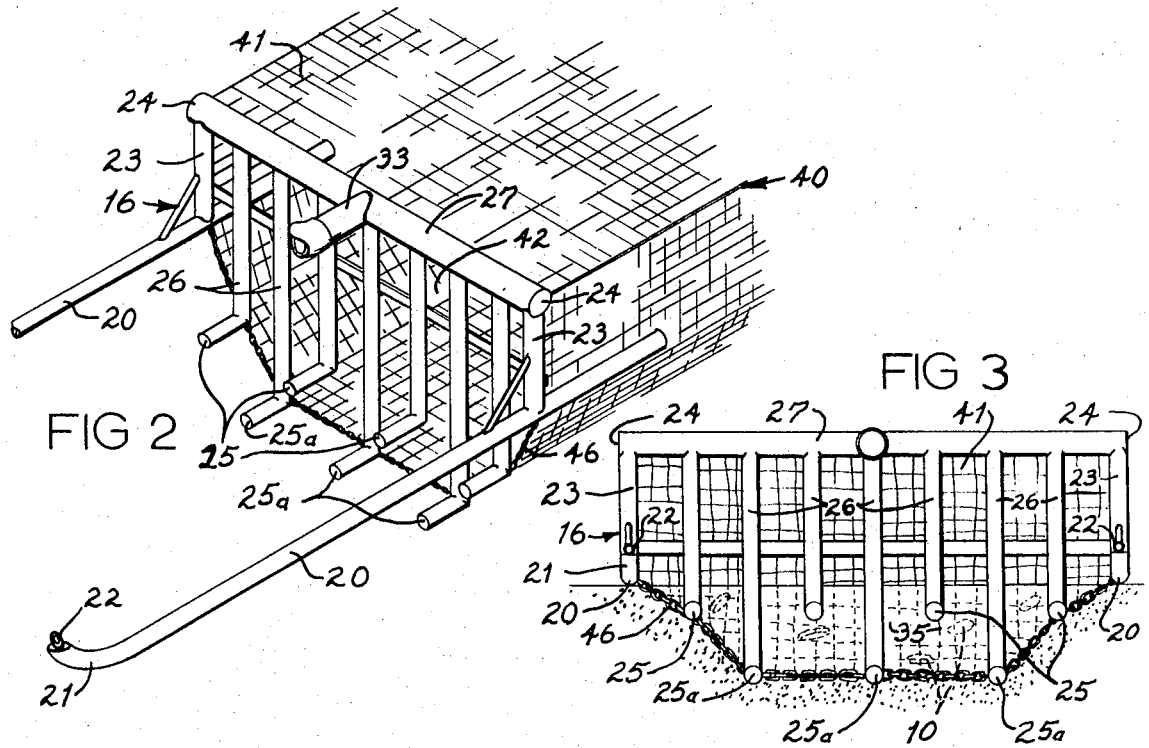
FIG 2
FIG 3
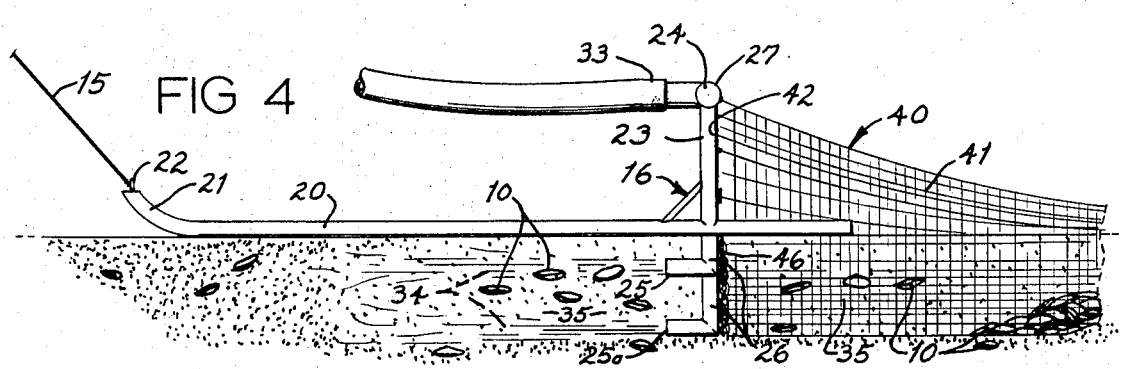
FIG 4

CLAM HARVESTER

BACKGROUND OF THE INVENTION

The present invention relates basically to the mollusk harvesting art and particularly to such harvesters utilized to harvest clams from the ocean floor and the soil below.

It has long been a problem to commercially harvest razor clams with any substantial degree of success. Such a problem does not exist in harvesting of cockle or surf clams which are sedate by nature and are frequently found on the surface of the ocean floor. Razor clams however are alert and active. When disturbed, razor clams are very quick to burrow deeply into the soil beneath the ocean floor. This characteristic makes the razor clam very difficult to harvest, especially without incurring a high mortality rate among the harvested clams.

Clam harvesters used primarily for harvesting the more sedentary clams are well known in the prior art. These harvesters usually are operated to first dislodge the clams, collect them together, and then transfer the collected bunch to a receiving boat by means of a mechanical conveyor or a dredge tube. The prior apparatus often make use of a rather rigid connection between the harvesting implement and the boat receiving the harvested clams. A rigid connection between the harvesting implement and a clam receiving boat transmits motion, imparted to the boat from waves or swells, to the harvesting implement causing undesired movement of the implement on the ocean floor. Such movement hampers harvesting and often damages or renders the harvested clams inedible.

A United States patent granted to Phillips, U.S. Pat. No. 1,415,113 discloses a clam-dredging machine that includes a substantially rigid fluid line leading from a supporting vessel to a gathering shroud adjacent the ocean floor. A fluid supply line is also provided, extending along the fluid line to an end below the shroud and also below the surface of the ocean floor. A fluid such as air is directed through the fluid supply line in order to dislodge clams within the soil with forward and upward directed fluid streams. The dislodged clams, along with whatever bottom material is dislodged by the fluid streams, are raised to the receiving boat through the fluid tube. The clams are then collected and the bottom material is dumped back into the ocean.

A first object of my invention is to provide a clam harvester that will efficiently harvest razor clams from below the surface of the ocean floor without substantially disturbing the ocean floor.

Another object is to provide such a harvester that may be connected to a receiving boat by a flexible cable so that movement of the boat on ocean swells or waves will not substantially effect the position of the harvester relative to the ocean bottom.

An additional object is to provide such a clam harvester that is sufficiently simple and lightweight in construction to enable its use with relatively small fishing boats.

It is a yet further object to provide such a clam harvester that will automatically harvest clams of a specific size while allowing smaller size clams to escape without injury.

It is another object to provide a clam harvester that is very simple in construction and thereby inexpensive to maintain and operate.

These and other objects and advantages will become evident upon reading the following description which, taken with the accompanying drawing, discloses a preferred form of the present invention.

A BRIEF DESCRIPTION OF THE DRAWING

A preferred form of the present invention is illustrated in the accompanying drawing in which:

FIG. 1 is a pictorial view illustrating the operation of the clam harvester;

FIG. 2 is a fragmentary pictorial view of the harvester;

FIG. 3 is a front elevational view of the harvester; and

FIG. 4 is a side elevational view of the harvester in operation.

DETAILED DESCRIPTION OF A PREFERRED EMBODIMENT

The apparatus of the present invention, as shown in the accompanying drawing, is utilized to harvest clams which are designated in the drawing by the reference numeral 10. Although the harvester is intended for use primarily in the harvesting of razor clams, it may be utilized for successfully harvesting any related mollusk whose habitat is adjacent to or below the surface of the ocean floor.

As illustrated in FIG. 1, the harvester is pulled along the ocean floor 11 behind a surface vessel 13 by a flexible towline 15. The towline 15 is of sufficient length to enable vertical movement of vessel 13 relative to the ocean floor 11 without causing any substantial responsive movement of the harvester. A supply hose 32 is also connected between the vessel 13 and the harvester. Supply hose 32 is an element of a supply means 30 that will be discussed in greater detail below.

Referring now to FIGS. 2, 3, and 4, the harvester is shown in greater detail comprising a supporting framework 16 mounted on elongated runners 20. The runners 20 support the harvester for sliding movement on the surface of the ocean floor 11. Each runner 20 includes an upturned forward end 21 that facilitates movement of the harvester in a forward direction of travel as determined by the towing vessel 13. A suitable connector such as an eyelet 22 is fixed to the upturned ends 21 for mounting the flexible towline 15.

The runners 20 are parallel to one another and are connected rigidly to a transverse cross member 27. The cross member 27 is supported elevationally above the runners 20 by upright posts 23 extending between the cross member 27 and each runner 20. The cross member 27 is formed of a hollow pipe having closed ends 24 adjacent the upright posts 23.

A plurality of fluid supply pipes 26 are mounted to the cross member 27. Supply pipes 26 are also hollow and are joined to the cross member 27 which acts as a manifold for directing fluid into the supply pipes 26. As may be seen in FIG. 3, the supply pipes 26 extend elevationally below the runners 20 and will therefore extend downwardly into the soil beneath the surface of the ocean floor 11. A jet nozzle 25 is supplied on each supply pipe 26. Jet nozzles 25 extend forwardly from the pipes 26 for directing jets of fluid forwardly into the soil beneath the surface of the ocean floor.

The jet nozzles 25 may be integral right angle extensions of the supply pipes 26 as illustrated in the drawings, or they may be provided as detachable units. The jet nozzles 25 must however be angularly positioned on the harvester so that jets of fluid 34 (FIG. 4) are directed therefrom forwardly and substantially parallel to the surface of the ocean floor 11. The jet nozzles 25 are elevationally staggered across the width of the harvester in an area located between the runners 20 and elevationally between the ocean floor surface 11 and the lowest jet nozzles 25a. This area defines the width and depth of a "swath" taken by the harvester as it moves along the ocean floor.

A fluid such as water is supplied under pressure to the jet nozzles 25 by a supply means 30 comprising a fluid pump 31 and the supply hose 32. The pump 31 is carried in the vessel 13 remote from the harvester framework 16. The supply hose 32 receives water under pressure from pump 31 and directs it through a connector tube 33 to the cross member 27. Connector tube 33 is located on the cross member 27 approximately midway between the closed ends 24. The water flows through the cross member 27, down the supply pipes 26 to the jet nozzles 25 where it is discharged forwardly into the soil beneath the ocean floor.

The amount of water supplied by supply means 30 and the pressure under which it is supplied is sufficient to impregnate and disseminate the soil particles below the ocean floor, ahead of the jet nozzles. The dislodged soil particles and water form a liquid suspension 35 as shown in FIGS. 3 and 4. Any clams in the path of the harvester as it is towed along the ocean floor are caught up and supported within the suspension 35. The clams 10 held in the suspension are unable to burrow through the suspended soil particles.

A collecting means 40 is provided that is connected behind the jet nozzles 25 to sift through and collect clams from the liquid suspension 35 created by the fluid jets 34. The collecting means 40 comprises an enclosure formed of a bag-shaped net 41. The net 41 includes an open end 42 located directly behind the jet nozzles 25, and a closed end 43 (FIG. 1) spaced substantially behind the open end. The enclosure is connected to the framework 16 so that open end 42 is vertically situated thereon and extends transversely across the harvester between the uprights 23 and vertically between the cross member 27 and the jet nozzles 25, 25a. The portion of the enclosure net 41 extending below the surface of the ocean floor 11 is connected to a chain 46 that is fastened to the runners 20 and at the bottom ends of several supply pipes 26 as shown in FIG. 3.

Having thus described the elements comprising the present invention, its operation may now be easily understood. In operation, water is supplied under pressure to the jet nozzles 25 as the vessel 13 moves along a forward path of travel to pull the harvester in a swath along the ocean floor. The fluid jets 34 dislodge the soil below the ocean floor to create liquid suspension 35 in which any clams 10 therein will not be able to burrow downwardly out of the swath. The vessel 13 is operated to tow the harvester at sufficient speed so the collecting means 40 is moved through the suspension before it settles. The meshes of net 41 are sufficiently large to allow the bottom material and small unusable clams to be sifted through the net meshes while the larger clams are collected therein. Once a sufficient number of clams 10 have collected within net 41, the harvester may be lifted by towline 15 onto the vessel 13 so that the collected clams may be removed.

It should be noted that the soil below the ocean floor engaged by the harvester is not substantially displaced during the harvesting operation. The material comprising the liquid suspension 35 will gradually settle back onto the ocean floor in substantially the same condition and location it was in prior to engagement by the harvester. This feature is very important since the ocean bottom is not sufficiently disturbed by the harvesting operation to damage other life forms in the direct vicinity of the harvester.

It may become obvious from the above description and the accompanying drawing that various changes and modifications may be made therein without departing from the intended scope of this invention. Therefore, only the following claims are to be taken as definitions of the present invention.

What I claim is:

1. A clam harvesting apparatus adapted to be moved along the ocean floor, comprising:

a supporting framework;

at least one runner extending forwardly along said framework with respect to a forward path of travel for slidably supporting the apparatus on the surface of the ocean floor;

a plurality of jet nozzles mounted to said framework at laterally and elevationally spaced locations below and parallel with said runner to engage the soil below the surface of the ocean floor;

said jet nozzles having discharge openings facing forward and spaced apart laterally with respect to said forward path for directing jets of fluid forward into the ocean floor soil below said runner parallel to the surface of the ocean floor;

supply means for supplying a fluid under sufficient pressure to affect a liquid suspension of the bottom material and clams therein immediately forward of and between the jet nozzles as the apparatus is moved in a swath on the ocean floor; and clam receiving means located directly behind the jet nozzles and extending below the ocean floor surface and operatively mounted to said framework for movement therewith through said liquid suspension to collect clams held therein while allowing the suspended soil to be sifted therethrough.

2. The clam harvesting apparatus set out in claim 1 wherein said jet nozzles are staggered elevationally relative to one another to further affect the liquid suspension.

3. The apparatus set out in claim 1 wherein said clam receiving means comprises an open mesh enclosure net having an open end directly behind said nozzles and a closed end spaced rearwardly from said open end.

4. The apparatus set out in claim 1 wherein said supply means comprises:

a pump carried remotely from said framework; and a supply hose interconnecting said pump and said jet nozzles.

5. A clam harvesting apparatus adapted to be moved along the ocean floor comprising:

a supporting framework;

elongated runners extending forwardly along said framework and spaced apart laterally with respect to a forward path of travel for slidably supporting the apparatus on the ocean floor;

a plurality of jet nozzles mounted to said framework between said runners and extending elevationally below and parallel with said runners to engage the soil below the surface of the ocean floor;

said jet nozzles having discharge openings facing forwardly and staggered elevationally for directing jets of fluid, forward and parallel to the ocean floor, into the soil below the surface of the ocean floor;

supply means for supplying a fluid under sufficient pressure to affect a liquid suspension of said soil and clams therein immediately forward of and between said jet nozzles and runners as the apparatus is pulled in a swath along the ocean floor; and clam receiving means mounted to said framework for movement therewith comprising an open mesh enclosure net having an open end directly behind said jet nozzles below the ocean floor surface and a closed end spaced rearwardly from said open end for sifting through the liquid suspension as the apparatus is moved forwardly to collect clams therein and sift remaining smaller clams and other particles of said suspension through open meshes therein.

* * * * *